United States Patent
Su et al.

(10) Patent No.: US 9,294,563 B2
(45) Date of Patent: Mar. 22, 2016

(54) APPARATUS AND METHOD FOR LEVEL-BASED SELF-ADJUSTING PEER-TO-PEER MEDIA STREAMING

(71) Applicant: OmniVision Technologies, Inc., Santa Clara, CA (US)

(72) Inventors: Xinhua Su, Santa Clara, CA (US); Hui Pan, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 348 days.

(21) Appl. No.: 13/779,239

(22) Filed: Feb. 27, 2013

(65) Prior Publication Data

US 2014/0244763 A1    Aug. 28, 2014

(51) Int. Cl.
*H04L 29/08* (2006.01)
*H04L 12/751* (2013.01)

(52) U.S. Cl.
CPC ...... *H04L 67/1057* (2013.01); *H04L 29/08144* (2013.01); *H04L 29/08306* (2013.01); *H04L 45/02* (2013.01); *H04L 67/04* (2013.01); *H04L 67/1044* (2013.01); *H04L 67/1061* (2013.01); *H04L 67/1063* (2013.01); *H04L 67/1072* (2013.01); *H04L 67/1089* (2013.01)

(58) Field of Classification Search
CPC .............. H04L 67/104; H04L 29/0836; H04L 29/08315; H04L 29/08378; H04L 45/02; H04L 29/08441; H04L 67/1072; H04L 67/1061

See application file for complete search history.

(56) References Cited

U.S. PATENT DOCUMENTS

| | | | |
|---|---|---|---|
| 6,115,753 A * | 9/2000 | Joens | 709/242 |
| 6,577,653 B1 * | 6/2003 | Rochberger et al. | 370/536 |
| 7,231,463 B2 * | 6/2007 | Nagendra et al. | 709/251 |
| 8,892,625 B2 * | 11/2014 | Liang et al. | 709/201 |
| 2005/0005014 A1 * | 1/2005 | Holmes et al. | 709/227 |
| 2008/0059631 A1 * | 3/2008 | Bergstrom et al. | 709/224 |
| 2009/0234917 A1 * | 9/2009 | Despotovic et al. | 709/204 |

OTHER PUBLICATIONS

Garces-Erice, Hierarchical Peer-to-Peer System, Sep. 2003, World Scientific, Parallel Processing Letter, vol. 13, Issue 04, Dec. 2003.*
Magharei, Nazanin, et al. "Understanidng Mesh-Based Peer-to-Peer Streaming," Dept of Computer & Information Science, NOSSIDAV, 2006.

(Continued)

*Primary Examiner* — Chirag R Patel
(74) *Attorney, Agent, or Firm* — Lathrop & Gage LLP

(57) ABSTRACT

An apparatus and method for media streaming in a peer-to-peer (P2P) network having a plurality of peer modules connected on the network include a source peer module connected on the network, the source peer module being associated with a highest logical level of the network. A plurality of viewer peer modules is also connected on the network, each viewer peer module being associated with a logical network level. The logical network level associated with each viewer peer module is a quantity of logical network levels that the viewer peer module is logically below the source peer module. The P2P network is configured such that each viewer peer module can be connected to no more than one up-peer module logically above the viewer peer module, and each viewer peer module can be connected to any integer number of down-peer modules logically below the viewer peer module.

28 Claims, 9 Drawing Sheets

(56) References Cited

OTHER PUBLICATIONS

Hudzia, Benoit, et al. "TreeP: A Tree Based P2P Network Architecture," University College Dublin, Ireland, Department of Computer Science, 2006.

Locher, Thomas, et al. "Push-to-Pull Peer-to-Peer Live Streaming," A. Pelc, Disc 2007, LNCS 4731, pp. 388-402, 2007.

Zhang, Meng, et al., "A Peer-to-Peer Network for Live Media Streaming-Using a Push-Pull Approach," Tsinghua Univ, Beijing, CN, Dept of Computer Science and Tech, 287-290, 2005.

Yin, Liangzhong, et al., DUP: Dynamic-tree Based Update Propagation in Peer-to-Peer Networks, Admitted Prior Art.

* cited by examiner

APPARATUS AND METHOD FOR LEVEL-BASED SELF-ADJUSTING PEER-TO-PEER MEDIA STREAMING

BACKGROUND

1. Technical Field

This disclosure is related to media streaming and, in particular, to media streaming in a peer-to-peer network.

2. Discussion of Related Art

Media streaming, for example, video or audio streaming, is a technology which can be implemented in various devices, including internet protocol (IP) cameras, mobile telephones or desktop computers using a web camera. Video or audio streaming is used by these devices to generate and transmit a compressed media file over the internet.

Various video streaming implementations are currently in use. Most implementations are based on browser/server (B/S) or client/server (C/S) architectures. These architectures typically rely on very high bandwidth for media delivery streaming. Another implementation uses peer-to-peer streaming, which requires much less bandwidth than B/S and C/S streaming.

Peer-to-peer streaming architectures can be classified into two primary groups: tree-based/push-based architectures and mesh-based/pull-based architectures. The tree-based/push-based architecture has low start-up delay, but it is less resilient to node failures. The tree-based/push-based architecture is also prone to bandwidth bottleneck issues. The mesh-based/pull-based architecture has a flexible large-scale ability, but it often introduces high latency due to data pull requests.

SUMMARY

According to one aspect of the present disclosure, a peer-to-peer (P2P) network for media streaming, comprising a plurality of peer modules connected on the network, is provided. The plurality of peer modules includes a source peer module associated with a highest logical level of the network and a plurality of viewer peer modules, each viewer peer module being associated with a logical network level. The logical network level associated with each viewer peer module is a quantity of logical network levels that the viewer peer module is logically below the source peer module. The P2P network is configured such that each viewer peer module can be connected to no more than one up-peer module logically above the viewer peer module, and each viewer peer module can be connected to any integer number of down-peer modules logically below the viewer peer module.

According to one aspect of the present disclosure, a method for media streaming in a peer-to-peer (P2P) network having a plurality of peer modules connected on the network is provided. According to the method, a source peer module is connected on the network, and the source peer module is associated with a highest logical level of the network. A plurality of viewer peer modules is also connected on the network, and each viewer peer module is also associated with a logical network level. The logical network level associated with each viewer peer module is a quantity of logical network levels that the viewer peer module is logically below the source peer module. The P2P network is configured such that each viewer peer module can be connected to no more than one up-peer module logically above the viewer peer module, and each viewer peer module can be connected to any integer number of down-peer modules logically below the viewer peer module.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

DETAILED DESCRIPTION

Figure 1:
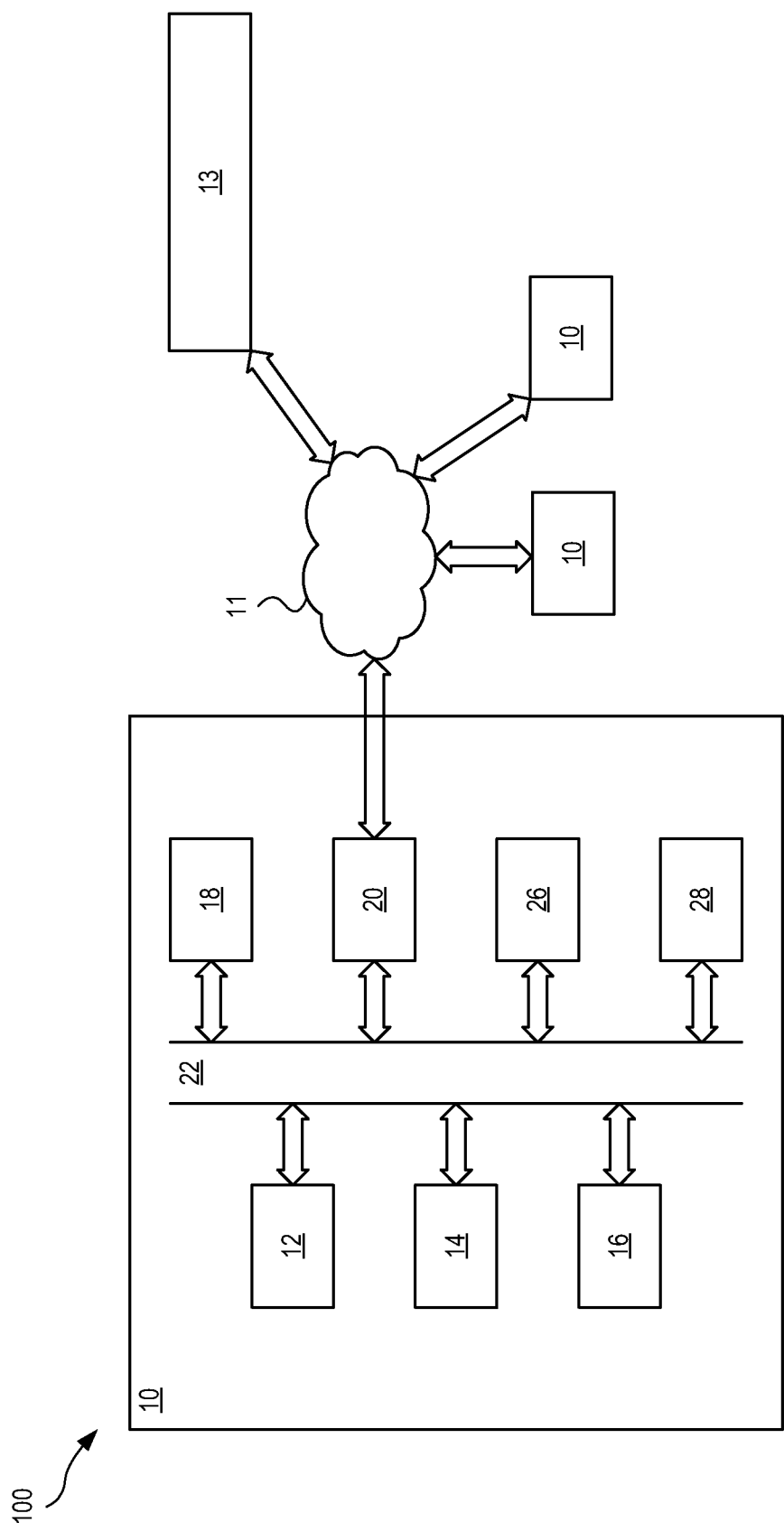
FIG. 1 includes a schematic block diagram of peer modules and a server on a network, including a detailed block diagram of an exemplary peer module, according to some exemplary embodiments.

The present disclosure is related to peer-to-peer (P2P) computer networks, in which each terminal device such as computer, smart phone or camera, referred to herein as a peer, peer module, node or node module, in the network acts as a sender or receiver of data for the other computers in the network, allowing all of the peers to share access to data. In particular, the network structure and data transmission protocol described in this disclosure can be used, for example, for live streaming of media data, for example, video and/or audio data.

Most of the many varied media streaming configurations in use today are based on browser/server or client/server architectures. These require large bandwidth for media delivery streaming because the server must individually stream media files to every client to which it is connected. An alternative configuration is the P2P streaming architecture, which requires less bandwidth, because each computer in the P2P network acts as a peer to share the task of data streaming.

P2P streaming architectures can be classified as one of two possible types. The first is a tree-based network that uses push-based data flow. In this configuration, the data source is logically located at the top of the tree and pushes data downward toward the first level of peers, which are connected to the source. The first-level peers then push data downward toward the second level of peers, which are connected to the first level of peers, and so on. The tree-based network has low start-up delay, but is not resilient to node failure or churn due to a high-level peer leaving the network. In addition, the tree-based network also suffers from a bandwidth bottleneck issue.

The second type of P2P streaming architecture is a mesh-based network, which uses pull-based data flow. The peers form a randomly connected and directed mesh, i.e., unstructured overlay, which is used for content delivery to individual peers. The data flow between each pair is unidirectional. Data flow is pull-based, meaning that a peer first makes a request for a file packet from its parent, and, if the parent has the file packet, the parent sends it to the requesting peer. The mesh-based network has a flexible large-scale ability, and is resilient to node failure or churn, but it suffers from high latency due to the relatively slow pull-based data flow using requests.

The present disclosure is directed to an architecture/method and system for live media streaming in a P2P network, wherein a media source and a viewer act as peers in the P2P network. The architecture/method/system is based on peer logical level in the P2P network. According to the disclosure, peers are organized and managed according to the logical levels of the peers in the network, and the logical levels of peers are dynamically adjusted according to current connection status and statistical information. Network data flow is based on a combination of push data flow and pull data flow. The P2P network of the disclosure provides advantages such as low latency, low bandwidth requirement, large-scale ability, resilience to node failure and churn, and other advantages.

FIG. 1 includes a schematic block diagram of a network 11, which includes a plurality of peers, peer modules, nodes or node modules 10 and a server 13 on network 11, according to some exemplary embodiments. FIG. 1 includes a detailed block diagram of one of peer modules 10. Referring to FIG. 1, each peer module 10 can be, for example, any device capable of processing data and communicating with other devices over network 11, which can be, for example, a wireless network, the Internet or other network. Each peer module 10 on network 11 can be, for example, a computer or a tablet with a webcam, a cellular telephone or a smart phone with a camera, an IP camera, or other such device capable of processing data and communicating with other devices on network 11 wirelessly, over wires or by a combination of wireless and wired communication.

Server 13 is also connected on network 11 and can communicate with any or all of peer modules 10. Server 13 is a software and/or hardware entity that runs one or more services of network 11 as a host. Server 13 may or may not be specifically dedicated as the host. Server 13 may be viewed as a manager of network 11. It is not a participant of the media stream.

Referring to FIG. 1, the illustrated exemplary peer module 10 can include at least a processor or central processing unit (CPU) 12, which carries out the processing of the peer module 10. The peer module 10 can also include any other circuitry used with processor 12 to carry out the processing of peer module 10, such as, for example, one or more memory circuits, indicated generally as 14, and other peripheral processing circuitry, indicated generally as 16. Peer module 10 can also include input/output (I/O) processing circuitry 18, which processes data input to peer module 10 via network transceiver 20 and/or output from peer module 10 via network transceiver 20. Network transceiver 20 can be any transceiver device capable of transmitting data to other peer modules 10 and/or server 13 on network 11 and/or receiving data from other peer modules 10 and/or server 13 on network 11 in a manner compatible with network 11, i.e., wireless and/or wired communication. Peer module 10 can also include a user interface 26, such as a mouse, keypad, touch screen or other such device for allowing a user to provide input. Peer module 10 can also include a display 28 for displaying information, including streamed video and/or audio. Within peer module 10, each of processor 12, memory 14, peripheral circuitry 16, I/O processing circuitry 18, network transceiver 20, user interface 26 and display 28 can communicate and transfer commands and data with each other as required over a system bus 22. The functionality of network 11 and peer modules 10 described herein is carried out by the various subsystems 12, 14, 16, 18, 20, 26 and 28 of peer module 10, server 13, and network 11.

According to some exemplary embodiments, peer modules 10 on network 11 communicate with each other over network 11 by a predetermined protocol. In some particular exemplary embodiments, the protocol in Reliable User Datagram Protocol (RUDP). In some particular exemplary embodiments, the protocol is Transmission Control Protocol (TCP). Since these protocols are well known in the art, they will not be described in detail herein.

Figure 2:
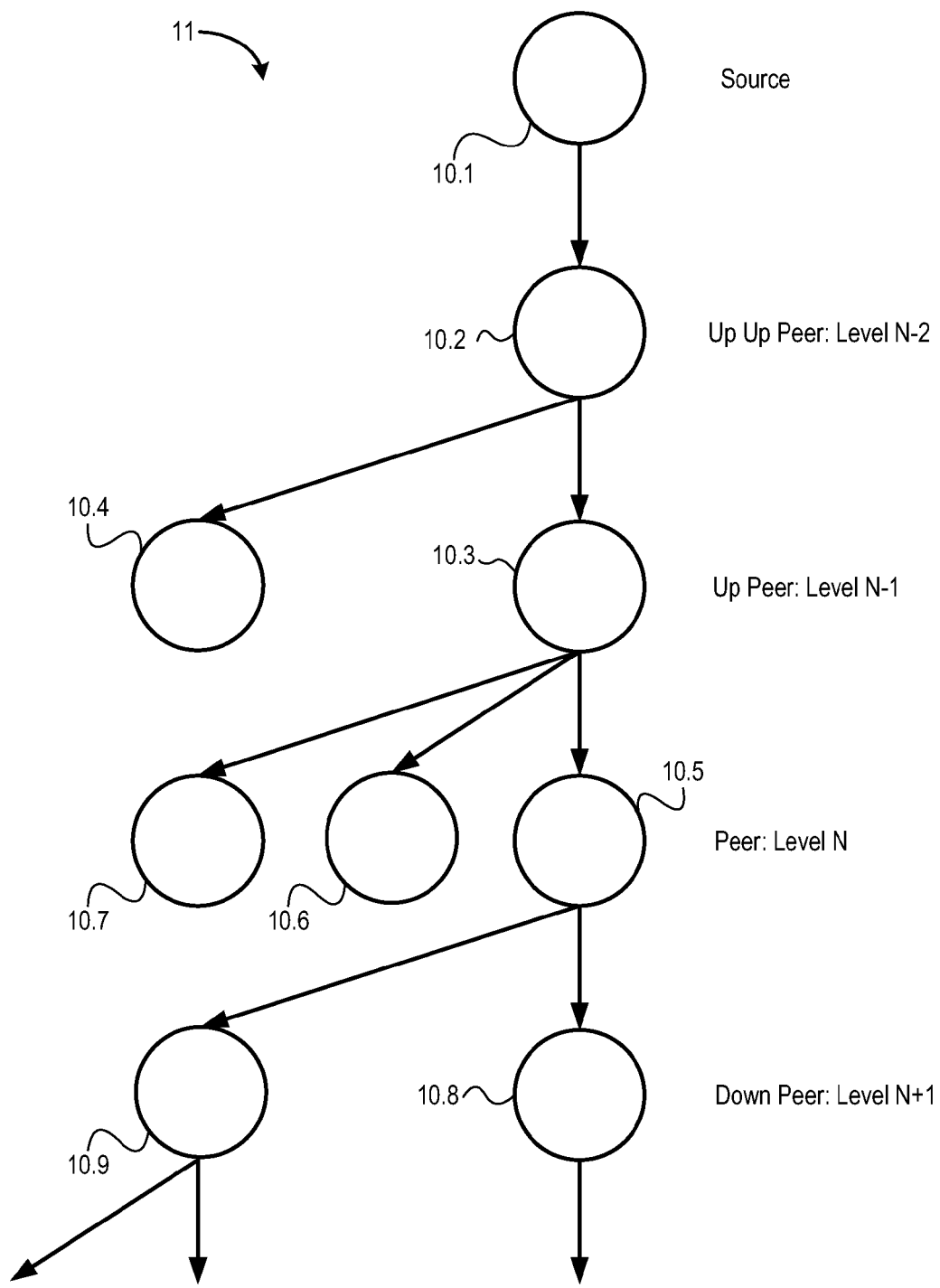
FIG. 2 includes a schematic block diagram of a portion of a network, according to some exemplary embodiments.

FIG. 2 includes a schematic block diagram of a portion of network 11, according to some exemplary embodiments. Referring to FIG. 2, network 11 includes a plurality of peer modules 10 at a plurality of logical levels of network 11. According to exemplary embodiments, management of network 11, peer modules 10 and the video streaming process are based on these logical levels of peer modules 10. Furthermore, according to the exemplary embodiments, the logical levels of peers 10 on network 11 are dynamically adjustable during network operation based on such factors as current connection status and statistical information.

Referring to FIG. 2, according to exemplary embodiments, peer module 10.1 can be a data source peer module, which can be a source of video and/or audio data to be streamed to one or more other peer modules 10. Source peer module 10.1 is positioned at the highest logical level of network 11. These other peer modules can serve as viewer peer modules used to assemble the streamed data and view the video image produced by the data. According to the exemplary configuration of network 11 illustrated in FIG. 2, the logical level immediately lower than that of source peer module 10.1 contains viewer peer module 10.2, which has two down-peers 10.3 and 10.4 at the next lower logical level. Viewer peer module 10.3 is illustrated as having three down-peers 10.5, 10.6 and 10.7. Peer module 10.4 is illustrated as having no down-peers. Viewer peer module 10.5 is illustrated as having two down-peers 10.8 and 10.9. It is noted that none of the peer modules 10 in network 11 has more than one up-peer.

As an exemplary illustration, peers 10.5, 10.6 and 10.7 are illustrated in FIG. 2 as being at logical level N. The two down-peers 10.8 and 10.9 of peer module 10.5 are at logical level N+1, which is one logical level lower than level N. The up-peer 10.3 of peers 10.5, 10.6 and 10.7 is at logical level N−1, which is one logical level higher than Level N, and the up-peer 10.2 of peer 10.3, referred to as the up-up-peer of peer 10.5, is at logical level N−2, which is one logical level higher than level N−1 and two logical levels higher than level N. In this exemplary illustration, it is also one logical level below source peer 10.1. Although FIG. 2 shows five logical levels of peers, it is only an example that is shown here for illustrative purpose. In actual configurations, there may be more or fewer logical levels of peers.

As noted above, according to exemplary embodiments, peers 10 are characterized according to their logical levels in network 11, as illustrated in FIG. 2. Each peer module 10 may have two types of related peers, namely, up-peers and down-peers. Each peer 10 can have at most one up-peer, and there is no limit to the number of down-peers each peer 10 can have. Source peer 10.1 is the only source in network 11, and it is logically situated at the highest level. All other peers can be referred to as viewer peers.

According to exemplary embodiments, each peer has two characteristics. These are logical level and ability. Logical level, as noted above, is the distance in levels to source peer 10.1. Thus, the peers directly below the source peer are level 1 peers, and the peers connected directly below level 1 are level 2 peers, etc. Ability is a measure of the available bandwidth for uploading. Ability of a peer may be adjusted dynamically according to bandwidth, round trip time (RTT), current number of down-peers and other factors.

According to exemplary embodiments, each peer stores and maintains two lists to keep track of its partnership status, that is, its status regarding present or potential partnership with, i.e., connection to, other peers 10 in network 11. One of the lists is referred to as a candidate partner list, which includes all other peers 10 which are eligible to become partnered with peer 10. The candidate partner list is initially requested from server 13 by peer 10 and uploaded to peer 10 from server 13. The candidate partner list is updated and maintained using a gossip procedure as described below in detail in connection with FIG. 7. The other list stored by peer 10 is a partners list, which is a list of current partner peers 10 connected to peer 10. Once a candidate peer 10 is connected to peer 10 via RUDP or TCP, the partner is added to the partner list and also removed from the candidate partner list. The pair of connected peers 10 are then partners of each other and are listed on each other's partners list. A partner connected to peer 10 can be an up-peer, a down-peer or a peer of the same level (e.g., level 100 to level 100) or a similar level (e.g., level 100 to level 95). The partner count in a list can have a maximum limit due to limitations of its resources, such as memory.

Figure 3:
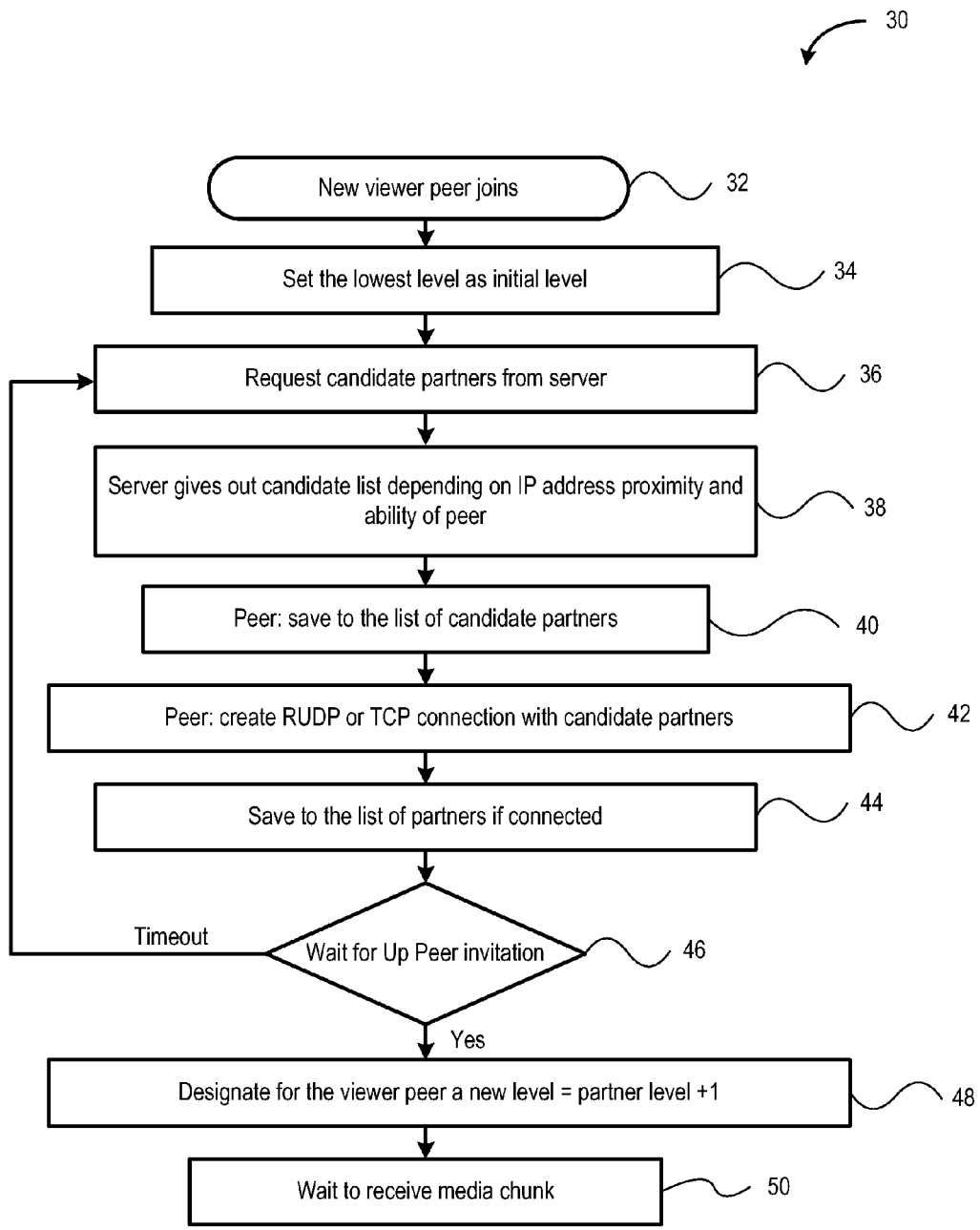
FIG. 3 includes a schematic logical flow diagram illustrating a process for designating logical level of a peer on a network, according to some exemplary embodiments.

FIG. 3 includes a schematic logical flow diagram illustrating a process 30 for designating logical level of a peer on a network, according to some exemplary embodiments. Referring to FIG. 3, from the perspective of a down-peer, a new viewer peer 10 joins network 11 in step 32. In step 34, the logical level of the new viewer peer is set to the lowest logical level in network 11. In step 36, new viewer peer 10 requests a list of candidate partners for its candidate partners list from server 13. In step 38, server 13 sends a candidate partners list to new viewer peer 10, depending on the IP address proximity of new viewer peer 10 and the ability of new viewer peer 10. Next, in step 40, new viewer peer 10 saves the list from server 13 to its candidate partners list. Next, in step 42, the peer attempts to make RUDP or TCP connections with these candidate partners. Next, in step 44, if the attempt to connect with a candidate partner is successful, then the connected partners are saved to the peer's partners list.

According to exemplary embodiments, when the peer creates RUDP or TCP connections with candidate partners, when partnership forms, a peer may choose to be a down-peer of its partner. A peer may also request to be an up-peer to its partner based on the level and ability of the partner, but this request may be rejected by the partner, such as when the partner already has an up-peer. A peer exchanges information with its partner. The information includes a chunk map, wherein a chunk is a portion of data, e.g., one or more frames of video or audio data, to be streamed and viewed, and a chuck map is information related to, e.g., absence, presence and storage locations of stored chunks. In step 46, new viewer peer 10 waits for one its new partners to be an up-peer. When it has an up-peer, then, in step 48, the level of peer 10 is set to one logical level lower than that of the up-peer. Then, in step 50, new viewer peer 10 waits to receive one or more chunks of media data.

In an alternative and parallel level designation process according to some exemplary embodiments, when a new viewer peer joins network 11, server 13 sends an identification of the new viewer peer to other selected peers. These peers then attempt to establish connections/partnerships with the new viewer peer.

In the peer designation process described above in detail, from the perspective of the up-peer, when a partnership forms, if a peer is not at the lowest logical level on network 11, i.e., it is an up-peer to some other peer, and if it has enough ability, it can invite its partner having the lowest logical network level to be its down-peer. The invited partner can respond in one of two ways. It can accept the invitation if it does not have an up-peer, or it can reject the invitation if it already has an up-peer.

According to some exemplary embodiments, peer 10 can update its candidate partners list in one of two possible ways. It can request new candidate partners from server 13 if peer 10 does not have candidate partners or does not have enough candidate partners, e.g., in some particular exemplary embodiments, peer 10 may have up to ten candidate partners. Alternatively, peer 10 can use a gossip procedure as described below in detail in connection with FIG. 7.

Figure 4A:
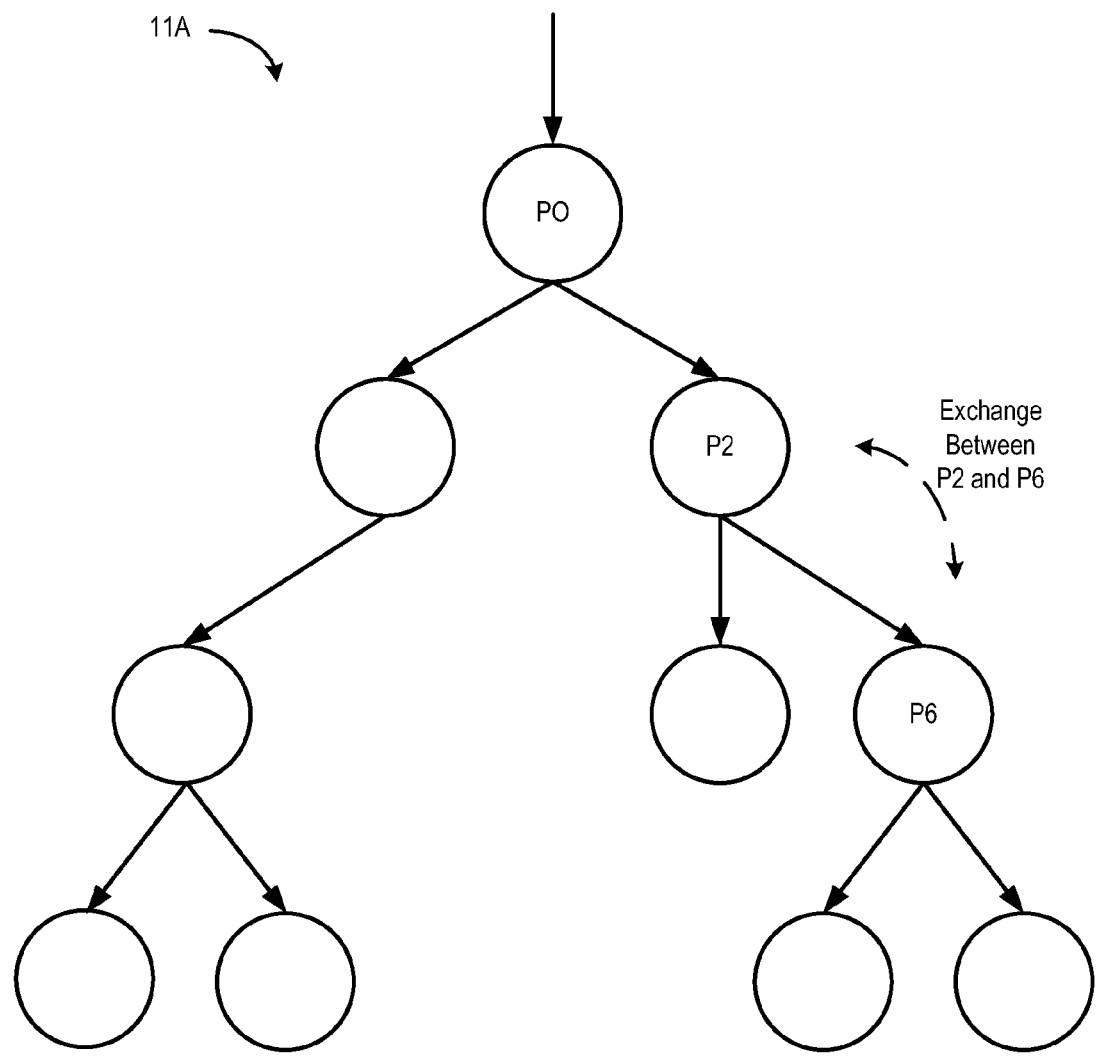
FIGS. 4A and 4B include schematic block diagrams illustrating a process of network maintenance using peer swapping, according to some exemplary embodiments.
Figure 4B:
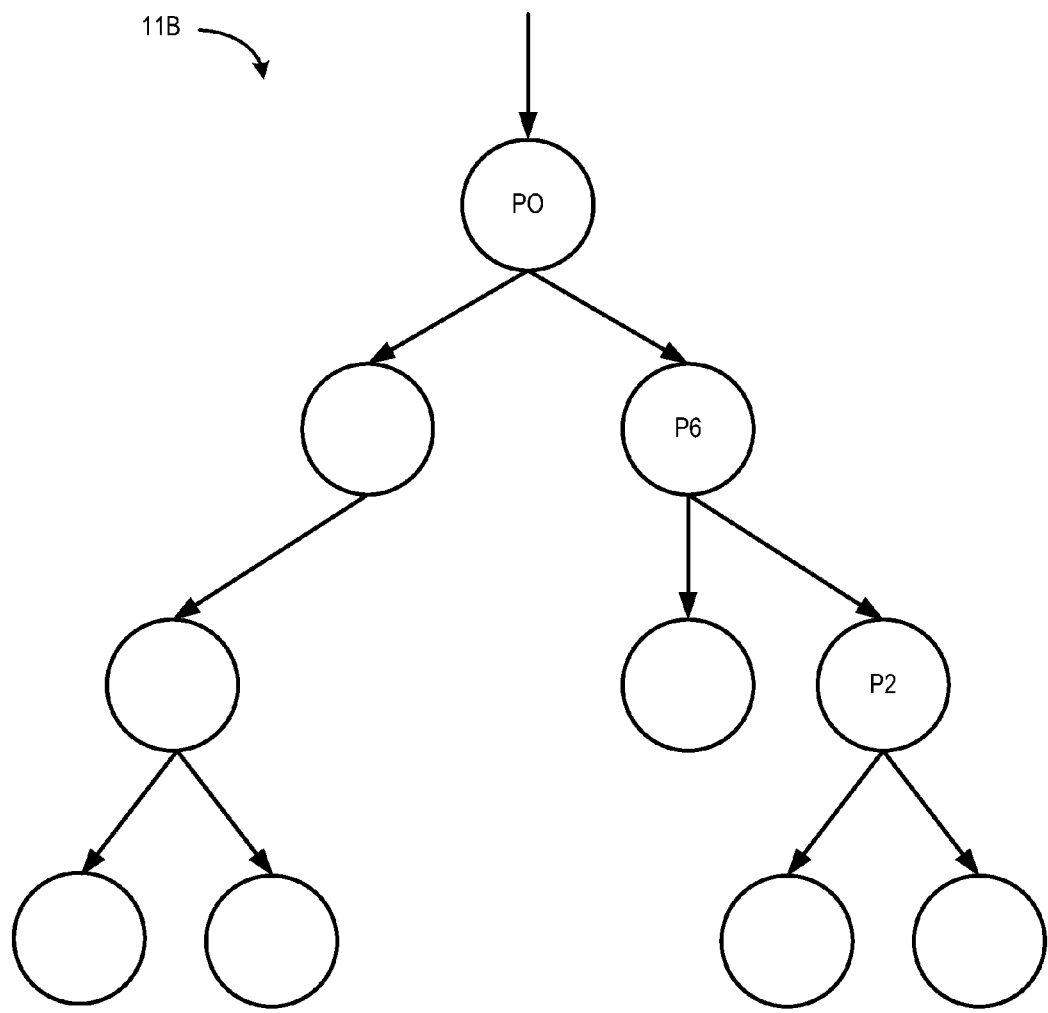

FIGS. 4A and 4B include schematic block diagrams illustrating a process of network maintenance using peer swapping, according to some exemplary embodiments. Referring to FIG. 4A, a portion of network 11A is illustrated. Peer P2 is a down-peer to peer P0 and is an up-peer to peer P6. In some situations, during operation of network 11A, it may be determined that a peer, e.g. peer P6 of FIG. 4A, has better ability, i.e., available bandwidth, and stability, which is related to the amount of time the peer has been connected on network 11A, than its up-peer P2. With these peer statistics, network function would be enhanced if peer P6 were at a higher logical level than peer P2. Accordingly, to resolve this issue, according to exemplary embodiments, a peer (P6) may swap logical positions in network 11A with its up-peer (P2). The result of this swap is illustrated in FIG. 4B, which illustrates peers P2 and P6 in the swapped positions in network 11B. As shown in FIG. 4B, except for the swap, all other peers are unaffected by the swap. Thus, according to exemplary embodiments, the better peer is dynamically upgraded to one logical level higher.

Figure 5:
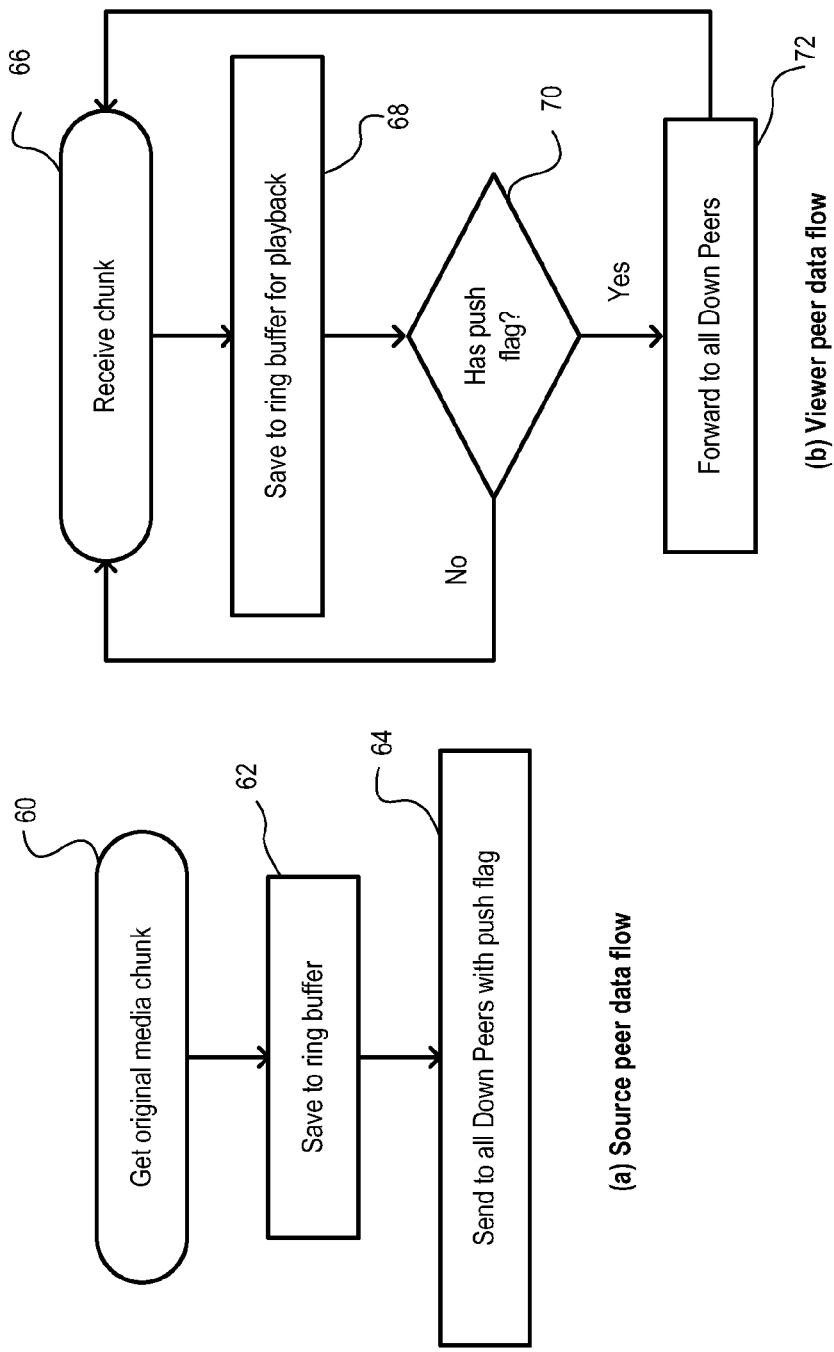
FIG. 5 includes two logical flow diagrams, labeled (a) and (b), which illustrate a push-based data flow process of the source peer and viewer peers, respectively, of the present disclosure, according to exemplary embodiments.
Figure 6:
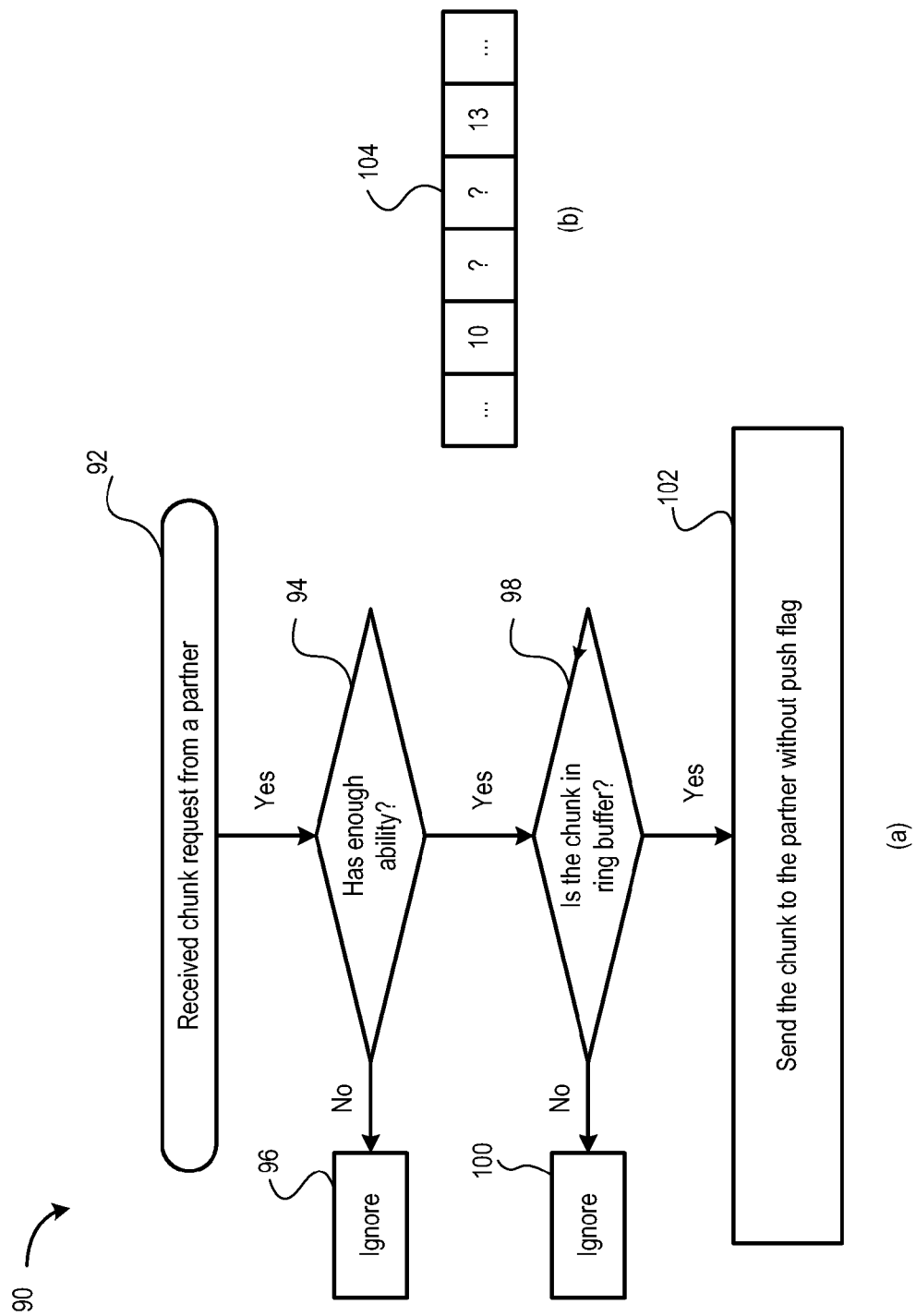
FIG. 6 includes a logical flow diagram, labeled (a), which illustrates a pull-based data flow process of the present disclosure and a schematic diagram, labeled (b), of a portion of video/audio data being streamed, according to exemplary embodiments.

FIGS. 5 and 6 are schematic diagrams which illustrate the network data flow process, according to some exemplary embodiments. Specifically, FIG. 5 includes two logical flow diagrams, labeled (a) and (b), which illustrate a push-based data flow process of the source peer and viewer peers, respectively, of the present disclosure, according to exemplary embodiments. FIG. 6 includes a logical flow diagram, labeled (a), which illustrates a pull-based data flow process of the present disclosure and a schematic diagram, labeled (b), of a portion of video/audio data being streamed, according to exemplary embodiments.

Referring to FIG. 5, as noted above, a data stream is typically divided into a plurality of chunks of media data, i.e., packets. According to exemplary embodiments, data flow is accomplished primarily by pushing data chunks. To that end, according to the source peer data flow of FIG. 5 (a), an original media chunk is obtained in step 60. The chunk is saved to a ring buffer of the source peer in step 62. The ring buffer can be part of the memory 14 and/or peripheral circuitry 16 of the peer module 10 illustrated and described in detail above in connection with FIG. 1. Next, in step 64, the source peer sends the newly obtained chunk to all of its down-peers with a push flag.

Referring to FIG. 5 (b), from the perspective of any of the viewer peers, the chunk of data is received from the source peer in step 66. The viewer peer saves the chunk to its own ring buffer for later playback in step 68. The viewer peer then determines in step 70 whether the chunk received from the source peer was accompanied by a push flag. If not, then flow returns to step 66 where the next chunk is awaited. If it is determined in step 70 that a push flag was received with the chunk of data, then, in addition to being saved in the peer's ring buffer for later playback, the chunk is also forwarded to all of the peer's down-peers for storage in their ring buffers for later playback and to be pushed to their down-peers. This pushing down to all down-peers continues until the last logical level of down-peers is reached by the chunk.

As noted above, the data flow of the exemplary embodiments is primarily by this push data flow of FIG. 5. According to exemplary embodiments, the push data flow is supplemented by pulling where pushing does not provide all of the desired data chunks to the appropriate viewer peers. When a viewer peer checks its chunk map and determines that a chunk is missing, the viewer peer can request the missing chunk from its partners. These requests for missing chunks are referred to as pull requests.

FIG. 6 (a) includes a schematic flow diagram illustrating the logical flow of the processing of pull requests, according to exemplary embodiments. According to exemplary embodiments, scheduling of pull requests for chunks depends on the partners' abilities. Specifically, in some exemplary embodiments, the partners with the better ability are asked first to provide missing chunks. That is, partners are asked to provide missing chunks in order of decreasing ability. When a partner receives a chunk request, it checks whether it has sufficient ability to handle the request and also whether the requested chunk is in its ring buffer. That is, a chunk request is received from a partner viewer peer in step 92. In step 94, the partner receiving the request checks its ability in step 94. If it does not have sufficient ability, it ignores the request in step 96. If the partner has sufficient ability, it then checks whether it has the requested chunk in its ring buffer in step 98. If not, then the partner ignores the request in step 100. If the peer does have the requested chunk in its ring buffer, then, in step 102, the chunk is sent to the requesting partner peer without a push flag.

FIG. 6 (b) includes a schematic diagram of an exemplary portion of data for streaming, according to exemplary embodiments. Referring to FIG. 6 (b), it is noted that the streaming data includes chunks identified as 10 and 13. Additionally, chunks 11 and 12 are missing. The viewer peer attempting to stream this data for playback would need to process two pull requests, one for chunk 11 and another for chunk for chunk 12.

Figure 7:
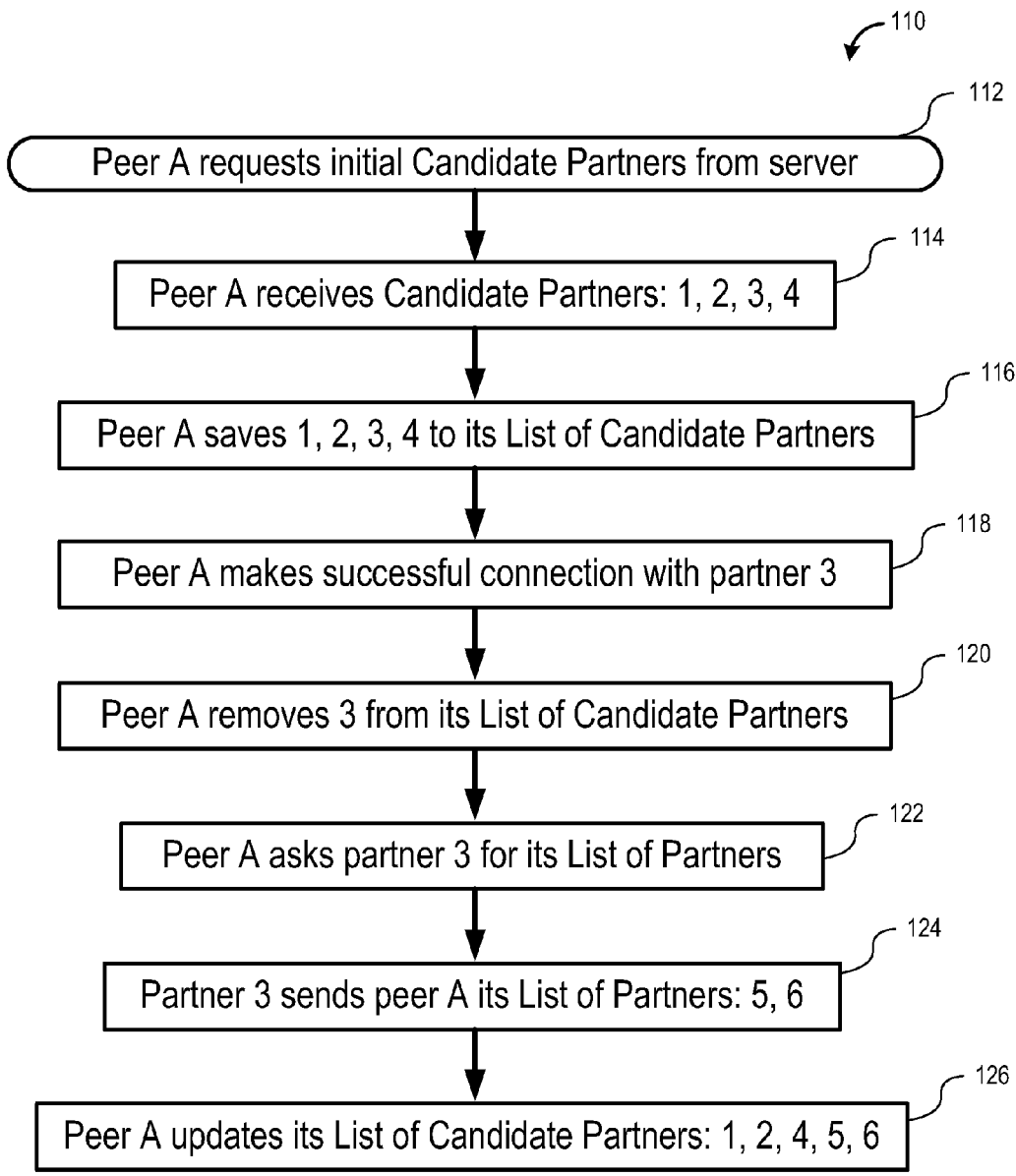
FIG. 7 includes a schematic logical flow diagram illustrating a gossip procedure used by a peer to update its candidate partners list, according to exemplary embodiments.

As described above in detail in connection with FIG. 2, according to exemplary embodiments, a peer can update its candidate partners list using a gossip procedure. FIG. 7 includes a schematic logical flow diagram illustrating a gossip procedure 110 used by a peer to update its candidate partners list, according to exemplary embodiments. Referring to FIG. 7, in step 112, the peer, referred to herein for the purpose of clarity of description as Peer A, requests an initial candidate partners list from server 13. As an exemplary illustration, Peer A receives the initial candidate partners list, which lists partners 1, 2, 3, 4, in step 114. In step 116, Peer A saves partners 1, 2, 3, 4 to its list of candidate partners. In step 118, Peer A makes a successful connection with partner 3. In response, in step 120, Peer A removes partner 3 from its list of candidate partners and adds partner 3 to its list of partners. In step 122, Peer A requests from new partner 3 its list of partners. In step 124, new partner 3 sends its list of partners to Peer A. As an exemplary illustration, the list of partners received from partner 3 includes its partners 5 and 6. In step 126, Peer A updates its list of candidate partners to include peers 1, 2, 4, 5, 6.

According to exemplary embodiments, network node or peer failure, as well as peer churn, can be compensated for and recovered from. If an up-peer of a peer leaves the network, the peer will deal with the situation in one of two ways. The peer can request a new up-peer connection from its up-up-peer, since the up-up-peer is likely to have been saved in the peer's list of candidate partners through the gossip procedure described in detail above in connection with FIG. 7. The peer may also request other partners from its candidate partners list. If both of these approaches fail, then the peer will disconnect all of its down-peers and set itself to the lowest level of the network.

Figure 8:
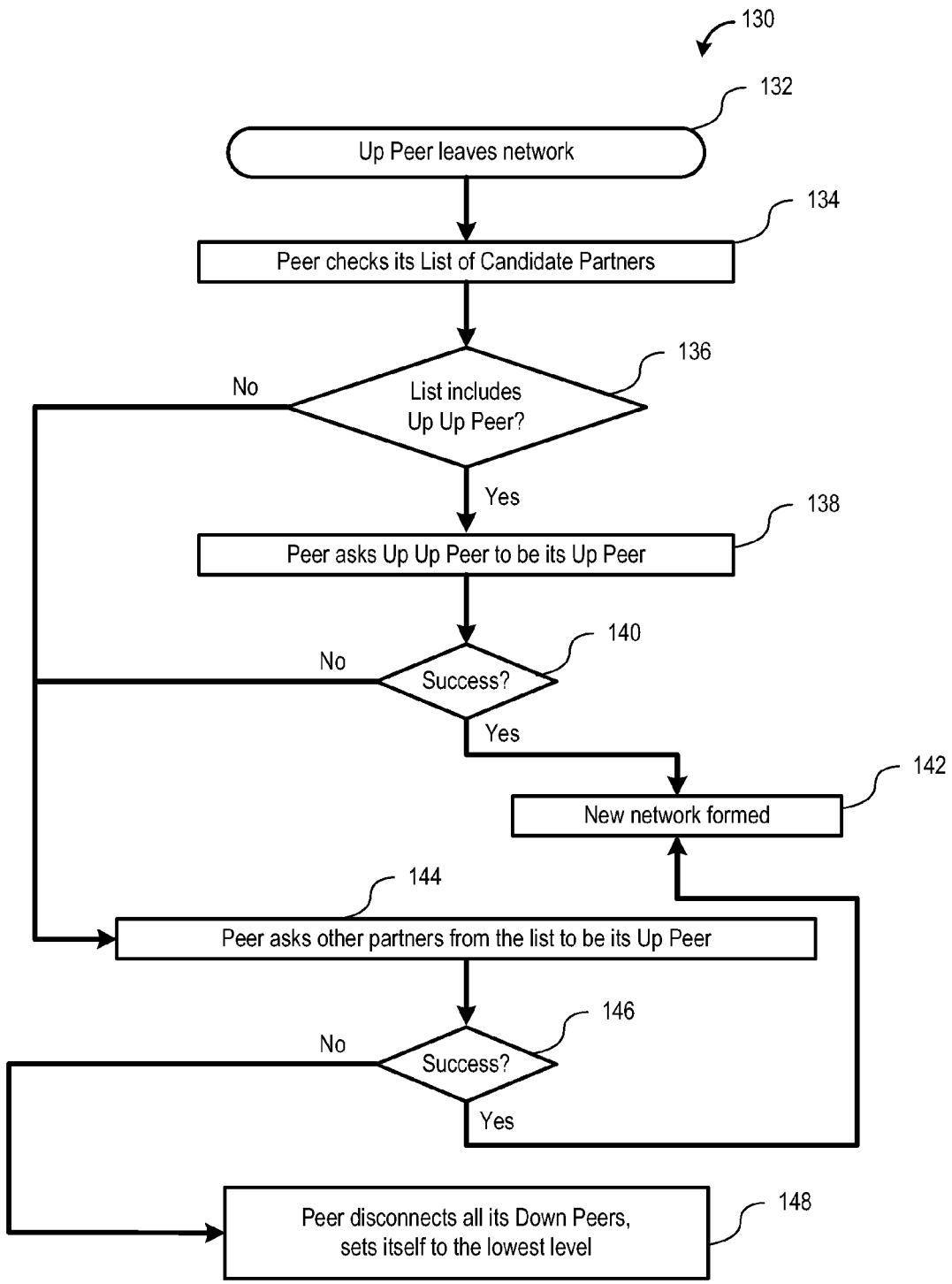
FIG. 8 includes a schematic logical flow diagram illustrating the logical flow of a process of recovering from peer failure or churn, according to some exemplary embodiments.

FIG. 8 includes a schematic logical flow diagram illustrating the logical flow of a process 130 of recovering from peer failure or churn, according to some exemplary embodiments. Referring to FIG. 8, in step 132, the up-peer leaves the network. In step 134, the peer whose up-peer has left the network checks its list of candidate partners. In step 136, a determination is made as to whether the list includes the peer's up-up-peer. If it does, then in step 138 the peer requests of the up-up-peer that it become the peer's up-peer. In step 140, if that request is successful, then the new network is formed in step 142, with the former up-up-peer being the new up-peer. If it is determined in step 136 that the list does not include the up-up-peer or it is determined in step 140 that the request to the up-up-peer is not successful, then, in step 144, the peer asks other partners form the list to be its up-peer. In step 146, a determination is made as to whether these requests are successful. If so, then the new network is formed in step 142. If not, then the peer disconnects all of its down-peers and sets itself to the lowest logical level in the network.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, connected peer modules can communicate via Reliable User Datagram Protocol (RUDP).

In any of the embodiments described in detail and/or claimed herein, connected peer modules can communicate via Transmission Control Protocol (TCP).

In any of the embodiments described in detail and/or claimed herein, each peer module can store a list of partner peer modules to which the peer module is connected for communication and a list of candidate partner peer modules to which the peer module can potentially become connected.

In any of the embodiments described in detail and/or claimed herein, each viewer peer module can receive an initial list of candidate partner peer modules from the server.

In any of the embodiments described in detail and/or claimed herein, the logical network level associated with each viewer peer module can be determined by the viewer peer module requesting the initial list of candidate partner peer modules from the server.

In any of the embodiments described in detail and/or claimed herein, the logical network level associated with each viewer peer module can be initially set to a lowest logical level in the network.

In any of the embodiments described in detail and/or claimed herein, the viewer peer module can create its list of partner peer modules by establishing communication with at least one other peer module.

In any of the embodiments described in detail and/or claimed herein, the logical network level of the viewer peer module can be set to one more than the logical network level of an up-peer module with which the viewer peer module establishes communication.

In any of the embodiments described in detail and/or claimed herein, the viewer peer module can be adapted to request that at least one other peer module having sufficient ability with which the viewer peer module establishes communication be a down-peer module.

In any of the embodiments described in detail and/or claimed herein, the viewer peer module can update its list of candidate partner peer modules by requesting the list of partner peer modules from at least one other peer module with which the viewer peer module establishes communication.

In any of the embodiments described in detail and/or claimed herein, the logical level associated with each viewer peer module can be dynamically adjustable based on a current connection status and statistical information.

In any of the embodiments described in detail and/or claimed herein, each viewer peer module can be adapted to swap logical network levels with another viewer peer module on the network.

In any of the embodiments described in detail and/or claimed herein, each viewer peer module can be adapted to recover from loss of an up-peer module by at least one of: (i) establishing communication with the up-peer module of the lost up-peer module, (ii) establishing communication with another peer module on the viewer peer module's list of candidate partner peer modules, and (iii) disconnecting from all of its down-peer modules and setting itself to a lowest logical level in the network.

In any of the embodiments described in detail and/or claimed herein, peer modules on the network can communicate using a combination of push data flow and pull data flow.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

We claim:

1. A peer-to-peer (P2P) network for media streaming, comprising a plurality of peer modules connected on the network, the plurality of peer modules comprising:
    a source peer module associated with a highest logical level of the network; and
    a plurality of viewer peer modules, each viewer peer module (a) being associated with a logical network level being a quantity of logical network levels that the viewer peer module is logically below the source peer module, and (b) storing a list of partner peer modules to which the peer module is communicatively connected and a list of candidate partner peer modules to which the peer module can potentially become communicatively connected, the P2P network being configured such that
    (a) each viewer peer module can be connected to no more than one up-peer module logically above the viewer peer module,
    (b) each viewer peer module can be connected to any integer number of down-peer modules logically below the viewer peer module, and
    (c) a new viewer peer module may join the network by performing the following steps:
        setting its logical network level as the lowest level in the network;
        requesting an initial list of candidate partner peer modules from a server of the P2P network;
        receiving the list of candidate partner peer modules from the server, the list depending on the IP address proximity to the new peer module;
        saving the list to its candidate partner list;
        attempting to make a connection with a candidate partner peer on the initial list using a transport layer protocol selected from a group consisting of RUDP and TCP;
        saving the candidate partner peer to which the new peer module successfully connects to its list of partner peer modules; and
        setting its logical network level to one more than the logical network level of the up-peer module with which the new viewer peer module establishes communication.

2. The P2P network of claim 1, wherein each viewer peer module receives an initial list of candidate partner peer modules from a server.

3. The P2P network of claim 2, wherein the logical network level associated with each viewer peer module is determined by the viewer peer module requesting the initial list of candidate partner peer modules from the server.

4. The P2P network of claim 3, wherein the logical network level associated with each viewer peer module is initially set to a lowest logical level in the network.

5. The P2P network of claim 4, wherein the viewer peer module creates its list of partner peer modules by establishing communication with at least one other peer module.

6. The P2P network of claim 5, wherein the logical network level of the viewer peer module is set to one more than the logical network level of an up-peer module with which the viewer peer module establishes communication.

7. The P2P network of claim 1, wherein the viewer peer module is adapted to request that at least one other peer module having sufficient ability with which the viewer peer module establishes communication be a down-peer module.

8. The P2P network of claim 1, wherein the viewer peer module updates its list of candidate partner peer modules by requesting the list of partner peer modules from at least one other peer module with which the viewer peer module establishes communication.

9. The P2P network of claim 1, wherein the logical level associated with each viewer peer module is dynamically adjustable based on a current connection status and statistical information.

10. The P2P network of claim 1, wherein each viewer peer module is adapted to swap logical network levels with another viewer peer module on the network.

11. The P2P network of claim 1, wherein each viewer peer module is adapted to recover from loss of an up-peer module by establishing communication with the up-peer module of the lost up-peer module.

12. The P2P network of claim 1, wherein peer modules on the network communicate using a combination of push data flow and pull data flow.

13. The P2P network of claim 1, wherein each viewer peer module is adapted to recover from loss of an up-peer module by establishing communication with another peer module on the viewer peer module's list of candidate partner peer modules.

14. The P2P network of claim 1, wherein each viewer peer module is adapted to recover from loss of an up-peer module by disconnecting from all of its down-peer modules and setting itself to a lowest logical level in the network.

15. A method for media streaming in a peer-to-peer (P2P) network having a plurality of peer modules connected on the network, the method comprising:
- connecting a source peer module on the network, the source peer module being associated with a highest logical level of the network;
- connecting a plurality of viewer peer modules on the network, each viewer peer module (a) being associated with a logical network level being a quantity of logical network levels that the viewer peer module is logically below the source peer module, and (b) storing a list of partner peer modules to which the peer module is communicatively connected and a list of candidate partner peer modules to which the peer module can potentially become communicatively connected;
- configuring the P2P network such that (a) each viewer peer module can be connected to no more than one up-peer module logically above the viewer peer module, and (b) each viewer peer module can be connected to any integer number of down-peer modules logically below the viewer peer module; and:
- configuring the P2P network such that a new viewer peer module may join the network by performing the following steps:
- setting its logical network level as the lowest level in the network; requesting an initial list of candidate partner peer modules from a server of the P2P network;
- receiving the list of candidate partner peer modules from the server, the list depending on the IP address proximity to the new peer module;
- saving the list to its candidate partner list;
- attempting to make a connection with a candidate partner peer on the initial list using a transport layer protocol selected from a group consisting of RUDP and TCP;
- saving the candidate partner peer to which the new peer module successfully connects to its list of partner peer modules; and
- setting its logical network level to one more than the logical network level of the up-peer module with which the new viewer peer module establishes communication.

16. The method of claim 15, wherein each viewer peer module receives an initial list of candidate partner peer modules from a server.

17. The method of claim 16, wherein the logical network level associated with each viewer peer module is determined by the viewer peer module requesting the initial list of candidate partner peer modules from the server.

18. The method of claim 17, wherein the logical network level associated with each viewer peer module is initially set to a lowest logical level in the network.

19. The method of claim 18, wherein the viewer peer module creates its list of partner peer modules by establishing communication with at least one other peer module.

20. The method of claim 19, wherein the logical network level of the viewer peer module is set to one more than the logical network level of an up-peer module with which the viewer peer module establishes communication.

21. The method of claim 15, wherein the viewer peer module is adapted to request that at least one other peer module having sufficient ability with which the viewer peer module establishes communication be a down-peer module.

22. The method of claim 15, wherein the viewer peer module updates its list of candidate partner peer modules by requesting the list of partner peer modules from at least one other peer module with which the viewer peer module establishes communication.

23. The method of claim 15, wherein the logical level associated with each viewer peer module is dynamically adjustable based on a current connection status and statistical information.

24. The method of claim 15, wherein each viewer peer module swaps logical network levels with another viewer peer module on the network.

25. The method of claim 15, wherein each viewer peer module recovers from loss of an up-peer module by establishing communication with the up-peer module of the lost up-peer module.

26. The method of claim 15, wherein peer modules on the network communicate using a combination of push data flow and pull data flow.

27. The method of claim 15, wherein each viewer peer module recovers from loss of an up-peer module by establishing communication with another peer module on the viewer peer module's list of candidate partner peer modules.

28. The method of claim 15, wherein each viewer peer module recovers from loss of an up-peer module by disconnecting from all of its down-peer modules and setting itself to a lowest logical level in the network.

* * * * *

UNITED STATES PATENT AND TRADEMARK OFFICE
CERTIFICATE OF CORRECTION

| | | |
|---|---|---|
| PATENT NO. | : 9,294,563 B2 | Page 1 of 1 |
| APPLICATION NO. | : 13/779239 | |
| DATED | : March 22, 2016 | |
| INVENTOR(S) | : Su et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this
Twenty-first Day of June, 2016

Michelle K. Lee
*Director of the United States Patent and Trademark Office*

UNITED STATES PATENT AND TRADEMARK OFFICE
CERTIFICATE OF CORRECTION

PATENT NO. : 9,294,563 B2  
APPLICATION NO. : 13/779239  
DATED : March 22, 2016  
INVENTOR(S) : Su et al.

Page 1 of 1

It is certified that error appears in the above-identified patent and that said Letters Patent is hereby corrected as shown below:

Title Page, item (56), line 17, "Understanidng" should read -- Understanding --  
Title Page, item (56), line 18, "NOSSIDAV" should read -- NOSSDAV --;  
Specification  
Column 7, line 31, "partners'abilities" should read -- partners' abilities --;  
Claims  
Column 11, line 33, "and:" should read -- and --.

Signed and Sealed this  
Twelfth Day of July, 2016

Michelle K. Lee  
*Director of the United States Patent and Trademark Office*